(12) United States Patent
Will et al.

(10) Patent No.: US 8,540,048 B2
(45) Date of Patent: Sep. 24, 2013

(54) SYSTEM AND METHOD FOR CONTROLLING TRANSMISSION BASED ON VARIABLE PRESSURE LIMIT

(75) Inventors: Bradley J. Will, Peoria, IL (US); Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/338,730

(22) Filed: Dec. 28, 2011

(65) Prior Publication Data

US 2013/0168179 A1 Jul. 4, 2013

(51) Int. Cl.
*B60K 17/10* (2006.01)
*F16H 61/38* (2006.01)

(52) U.S. Cl.
USPC ............ 180/338; 60/445; 180/307; 180/367; 477/38; 477/52; 701/51

(58) Field of Classification Search
USPC .......... 60/445, 449, 451, 452, 490; 180/6.48, 180/197, 305–308, 338, 367; 477/38, 50, 477/52; 701/51, 53, 54, 70, 82, 84, 87, 90, 701/99
See application file for complete search history.

(56) References Cited

U.S. PATENT DOCUMENTS

| | | | |
|---|---|---|---|
| 3,709,065 A * | 1/1973 | Starling | 475/128 |
| 3,795,107 A | 3/1974 | Ward | |
| 3,803,841 A | 4/1974 | Erickson et al. | |
| 3,827,522 A * | 8/1974 | Krause | 180/306 |
| 3,914,938 A | 10/1975 | Cornell et al. | |
| 3,946,560 A | 3/1976 | MacIntosh et al. | |
| 4,019,596 A | 4/1977 | Crull | |
| 4,085,812 A | 4/1978 | Robinson et al. | |
| 4,086,767 A | 5/1978 | Byers, Jr. | |
| 4,091,617 A * | 5/1978 | Cornell | 60/445 |
| 4,126,994 A | 11/1978 | Rockwell | |
| 4,165,613 A | 8/1979 | Bernhoft et al. | |
| 4,364,230 A * | 12/1982 | Holmes | 60/444 |
| 4,399,886 A | 8/1983 | Pollman | |
| 4,400,935 A | 8/1983 | Louis | |
| 4,465,942 A | 8/1984 | Deicke | |
| 4,606,005 A | 8/1986 | Ribbens | |
| 4,689,955 A | 9/1987 | Lietzke | |
| 4,739,616 A | 4/1988 | Myers | |
| 4,934,985 A | 6/1990 | Strubbe | |
| 4,995,470 A * | 2/1991 | Yamaguchi et al. | 180/197 |
| 5,203,168 A | 4/1993 | Oshina et al. | |
| 5,270,578 A | 12/1993 | Yamamura | |
| 5,337,629 A * | 8/1994 | Kita | 477/52 |

(Continued)

FOREIGN PATENT DOCUMENTS

| | | |
|---|---|---|
| EP | 2341265 | 7/2011 |
| KR | 100193066 | 6/1999 |

*Primary Examiner* — Joseph Rocca
*Assistant Examiner* — Laura Freedman
(74) *Attorney, Agent, or Firm* — Finnegan, Henderson, Farabow, Garrett & Dunner LLP

(57) ABSTRACT

A system for controlling a transmission including a fluid pump and a fluid motor operably coupled to one another in a fluid circuit is disclosed. The system includes a controller configured to receive signals indicative of operator inputs, and determine a variable pressure limit in the fluid circuit based on the signals indicative of operator inputs. The controller is further configured to control displacement of at least one of the fluid pump and the fluid motor based on the variable pressure limit, such that a pressure level in the fluid circuit is maintained below the variable pressure limit.

15 Claims, 4 Drawing Sheets

(56) References Cited

U.S. PATENT DOCUMENTS

| | | | | |
|---|---|---|---|---|
| 5,416,702 | A | 5/1995 | Kitagawa et al. | |
| 5,447,029 | A | 9/1995 | Swick et al. | |
| 5,628,187 | A | 5/1997 | Gollner | |
| 5,845,221 | A | 12/1998 | Hosokawa et al. | |
| 6,217,479 | B1 | 4/2001 | Brown et al. | |
| 6,374,605 | B1 * | 4/2002 | Dvorak et al. | 60/444 |
| 6,377,884 | B1 | 4/2002 | Loeffler et al. | |
| 6,472,772 | B2 | 10/2002 | Onizuka et al. | |
| 6,536,402 | B2 | 3/2003 | Houchin et al. | |
| 6,581,565 | B2 | 6/2003 | Heslop et al. | |
| 6,675,577 | B2 | 1/2004 | Evans | |
| 6,700,386 | B2 | 3/2004 | Egami | |
| 6,704,638 | B2 | 3/2004 | Livshiz et al. | |
| 6,807,474 | B2 | 10/2004 | Bergqvist et al. | |
| 6,819,997 | B2 | 11/2004 | Buchanan et al. | |
| 6,842,686 | B2 | 1/2005 | Homeyer et al. | |
| 6,859,711 | B2 | 2/2005 | Eckert et al. | |
| 6,986,398 | B2 | 1/2006 | Obayashi | |
| 7,098,555 | B2 | 8/2006 | Glahn et al. | |
| 7,137,347 | B2 | 11/2006 | Wong et al. | |
| 7,146,263 | B2 | 12/2006 | Guven et al. | |
| 7,240,487 | B2 | 7/2007 | Diaz et al. | |
| 7,260,931 | B2 | 8/2007 | Egelja et al. | |
| 7,310,943 | B2 | 12/2007 | Burgart et al. | |
| 7,370,475 | B2 * | 5/2008 | Nakamura et al. | 60/449 |
| 7,798,272 | B2 * | 9/2010 | Pruitt et al. | 180/197 |
| 7,905,089 | B2 * | 3/2011 | Ma et al. | 60/422 |
| 7,926,267 | B2 * | 4/2011 | Koehler et al. | 60/492 |
| 8,016,069 | B2 * | 9/2011 | Chisholm et al. | 180/307 |
| 2004/0267436 | A1 | 12/2004 | Prodi et al. | |
| 2005/0057208 | A1 | 3/2005 | Seibel et al. | |
| 2005/0171669 | A1 | 8/2005 | Sato | |
| 2007/0068220 | A1 | 3/2007 | Mahajan et al. | |
| 2007/0141999 | A1 | 6/2007 | Przywecki | |
| 2010/0154403 | A1 * | 6/2010 | Brickner et al. | 60/452 |
| 2011/0196585 | A1 * | 8/2011 | Ishibashi et al. | 701/51 |
| 2011/0202243 | A1 * | 8/2011 | Ishibashi et al. | 701/51 |
| 2011/0308878 | A1 | 12/2011 | Shirao | |

* cited by examiner

SYSTEM AND METHOD FOR CONTROLLING TRANSMISSION BASED ON VARIABLE PRESSURE LIMIT

TECHNICAL FIELD

The present disclosure is directed to a system and method for controlling a transmission and, more particularly, to a system and method for controlling a hydraulic transmission based on a variable pressure limit.

BACKGROUND

Machines may include one or more hydraulic circuits for operation of the machine, including a hydraulic transmission for providing propulsion. The hydraulic transmission may include one or more hydraulic circuits including a hydraulic pump and a hydraulic motor. For example, some machines may include a variable displacement hydraulic pump and/or a variable displacement hydraulic motor. The hydraulic pump may be driven by a prime mover, and by varying the displacement and/or speed of the hydraulic pump, the amount of fluid pumped to the hydraulic motor may be controlled. Fluid pumped to the hydraulic motor causes it to drive an output shaft coupled to one or more traction devices, such as wheels and/or ground engaging tracks. By varying the ratio of the displacement of the hydraulic pump to the displacement of the hydraulic motor, the speed at which the hydraulic motor drives the output shaft may be controlled.

Under certain operational conditions, pressure may build in the hydraulic circuit to a level higher than desired, and thus, it may be desirable to regulate the pressure. For example, when movement of the machine is inhibited by an external resistance, pressure may build within the hydraulic circuit that drives the traction devices, for example, when the machine pushes against a large pile of earth. This may result in travel of the machine being slowed or stopped. The slowing or stopping of the machine may cause the traction devices to also be slowed or stopped, which, in turn, slows or stops the hydraulic motor coupled to the traction devices. As the hydraulic motor is slowed or stopped, the flow of fluid through the hydraulic motor may be substantially inhibited, even though the flow of fluid supplied from the hydraulic pump may continue at substantially the same flow rate. As a result, pressure in the circuit may increase beyond desired levels, which may be related to machine design limits and/or the physical characteristics of the fluid in the hydraulic circuit. As a result, it may be desirable to regulate pressure in the hydraulic transmission to prevent the pressure from reaching an undesirably high level while still enabling the operator to control the machine in a responsive manner.

One attempt to control a machine having a hydrostatic transmission is described in U.S. Pat. No. 7,146,263 B2 to Guven et al. ("the '263 patent"). The '263 patent discloses a method for predictive load management. According to the '263 patent, a control system is operable to receive at least one input indicative of a load on a transmission and to identify a desired load of the transmission based on the at least one input. The control system is also operable to receive at least one input indicative of current power output of a power source. The control system of the '263 patent limits the desired transmission load applied to the driven member of the transmission based on the current power output of the power source to thereby prevent the power source from operating outside the desired operating range.

Although the method disclosed in the '263 patent may prevent the power source from operating outside of a desired operating range, the method may suffer from a number of possible drawbacks. For example, the method described in the '263 patent may suffer from inefficiencies. In addition, the method disclosed in the '263 patent may not adequately regulate pressure in a hydraulic transmission while still enabling the operator to control the machine in a responsive manner.

The systems and methods disclosed herein may be directed to mitigating or overcoming one or more of the possible drawbacks set forth above.

SUMMARY

In one aspect, the present disclosure includes a system for controlling a transmission including a fluid pump and a fluid motor operably coupled to one another in a fluid circuit. The system includes a controller configured to receive signals indicative of operator inputs, and determine a variable pressure limit in the fluid circuit based on the signals indicative of operator inputs. The controller is further configured to control displacement of at least one of the fluid pump and the fluid motor based on the variable pressure limit, such that a pressure level in the fluid circuit is maintained below the variable pressure limit.

In another aspect, the present disclosure includes a method for controlling a transmission including a fluid pump and a fluid motor operably coupled to one another in a fluid circuit. The method includes receiving signals indicative of operator inputs, and determining a variable pressure limit in the fluid circuit based on the signals indicative of operator inputs. The method further includes controlling displacement of at least one of the fluid pump and the fluid motor based on the variable pressure limit, such that a pressure level in the fluid circuit is maintained below the variable pressure limit.

According to a further aspect, a machine includes a chassis, a prime mover coupled to the chassis, and a transmission coupled to the prime mover. The transmission includes a fluid pump configured to provide a flow of fluid, a fluid motor configured to receive the flow of fluid from the fluid pump, and fluid lines providing a fluid circuit including the fluid pump and the fluid motor. The machine further includes traction devices coupled to the transmission, such that the traction devices are supplied with torque from the transmission. The machine further includes a controller configured to receive signals indicative of operator inputs, determine a variable pressure limit in the fluid circuit based on the signals indicative of operator inputs, and control displacement of at least one of the fluid pump and the fluid motor based on the variable pressure limit, such that a pressure level in the fluid circuit is maintained below the variable pressure limit.

DETAILED DESCRIPTION

Figure 1:
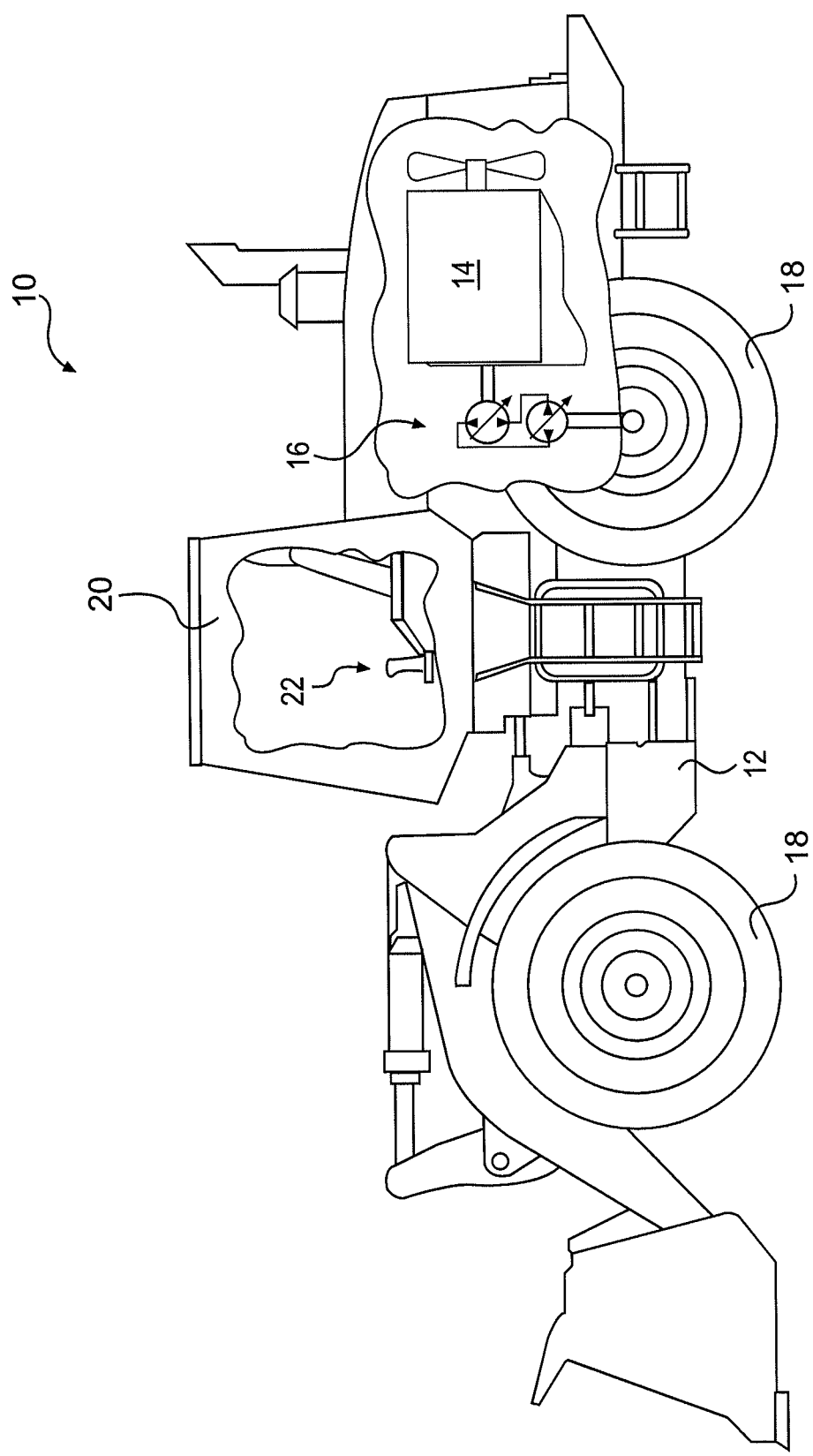
FIG. 1 is a side view of an exemplary embodiment of a machine.
Figure 2:
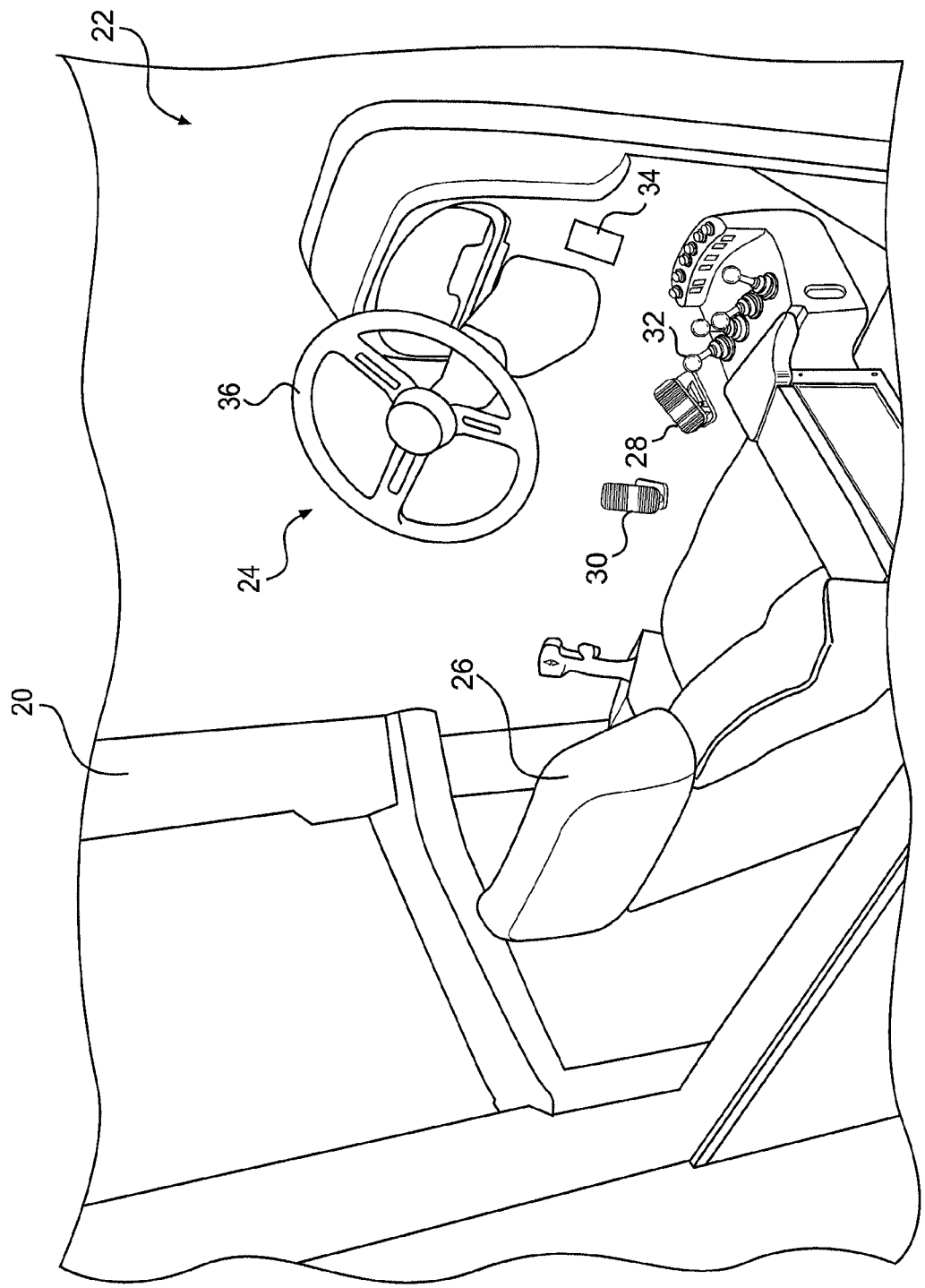
FIG. 2 is a perspective view of the interior of an exemplary embodiment of a cab of the exemplary machine shown in FIG. 1.

FIG. 1 illustrates an exemplary embodiment of a machine 10. Exemplary machine 10 includes a chassis 12, a prime mover 14, and a power train 16 coupled to chassis 12. Power train 16 operably couples prime mover 14 to one or more traction devices 18 configured to propel machine 10. Exemplary machine 10 further includes a cab 20 housing an operator interface 22, including one or more control devices configured to permit an operator to control the speed and/or direction of the machine's path of travel. For example, as shown in FIG. 2, operator interface 22 may include one or more operator interface devices 24 located proximate an operator seat 26. Operator interface devices 24 may be configured to send signals indicative of operator inputs. For example, operator interface devices 24 may initiate movement of machine 10 by producing signals indicative of a desired machine maneuver.

According to the exemplary embodiment shown in FIG. 2, operator interface devices 24 include a first travel speed input device, such as a right-foot pedal 28, and second travel speed input device, such as a left-foot pedal 30. As an operator manipulates right-foot pedal 28 and/or left-foot pedal 30, the operator may control machine travel. The terms "right-foot" and "left-foot" are used herein to distinguish the two input devices from one another, and it is contemplated that the functions of the two pedals described herein may be reversed. It is also contemplated that the functions of the two pedals may be selectable by the operator to permit tailoring of operation to improve comfort for the operator. It is also contemplated that foot pedals 28 and 30 may take on other forms, such as, for example, joysticks, levers, switches, knobs, wheels, and other interface devices known in the art.

In addition, the exemplary operator interface devices 24 shown in FIG. 2 also include a forward-neutral-reverse (FNR) selector 32. As the operator moves FNR selector 32 to a forward, reverse, or neutral position, the operator may affect a corresponding transmission operating mode, such as, for example, forward, reverse, or idle. In the exemplary embodiment shown in FIG. 2, FNR selector 32 is in the form of a lever. However, FNR selector 32 may have forms other than a lever known in the art.

According to the exemplary embodiment shown in FIG. 2, operator interface devices 24 include a rim-pull selector 34 configured to permit selection of a rim-pull setting for power train 16. As described in more detail herein, the rim-pull setting relates to control of the maximum level of torque available at traction devices 18. This may permit an operator to control the maximum amount of slip of traction devices 18. The exemplary rim-pull selector 34 shown in FIG. 2 includes a keypad. Other forms of selectors are contemplated, such as, for example, radial dials, push buttons, joysticks, levers, switches, knobs, wheels, and other selector devices known in the art.

The exemplary embodiment shown in FIG. 2 also includes a steering device 36 in the exemplary form of a steering wheel. Other steering devices known to those skilled in the art are contemplated, such as, for example, one or more joysticks.

Although the exemplary machine 10 shown in FIG. 1 is a wheel loader, machine 10 may be any type of ground-borne vehicle, such as, for example, an automobile, a truck, an agricultural vehicle, or a construction vehicle, such as, for example, a dozer, a track-type tractor, an excavator, a grader, an on-highway truck, an off-highway truck, or any other vehicle type known to a person skilled in the art. Moreover, prime mover 14 may be any device that generates power, such as, for example, an internal combustion engine, including but not limited to spark-ignition engines, compression-ignition engines, rotary engines, gas turbine engines, and/or engines powered by gasoline, diesel fuel, bio-diesel, ethanol, methanol, and combinations thereof; hydrogen-powered engines; fuel cells; solar cells; and/or any other power source known in the art. Further, although the exemplary traction devices 18 shown in FIG. 1 are wheels, traction devices 18 may include tracks, belts, and/or any other device(s) for propelling a machine known in the art.

Figure 3:
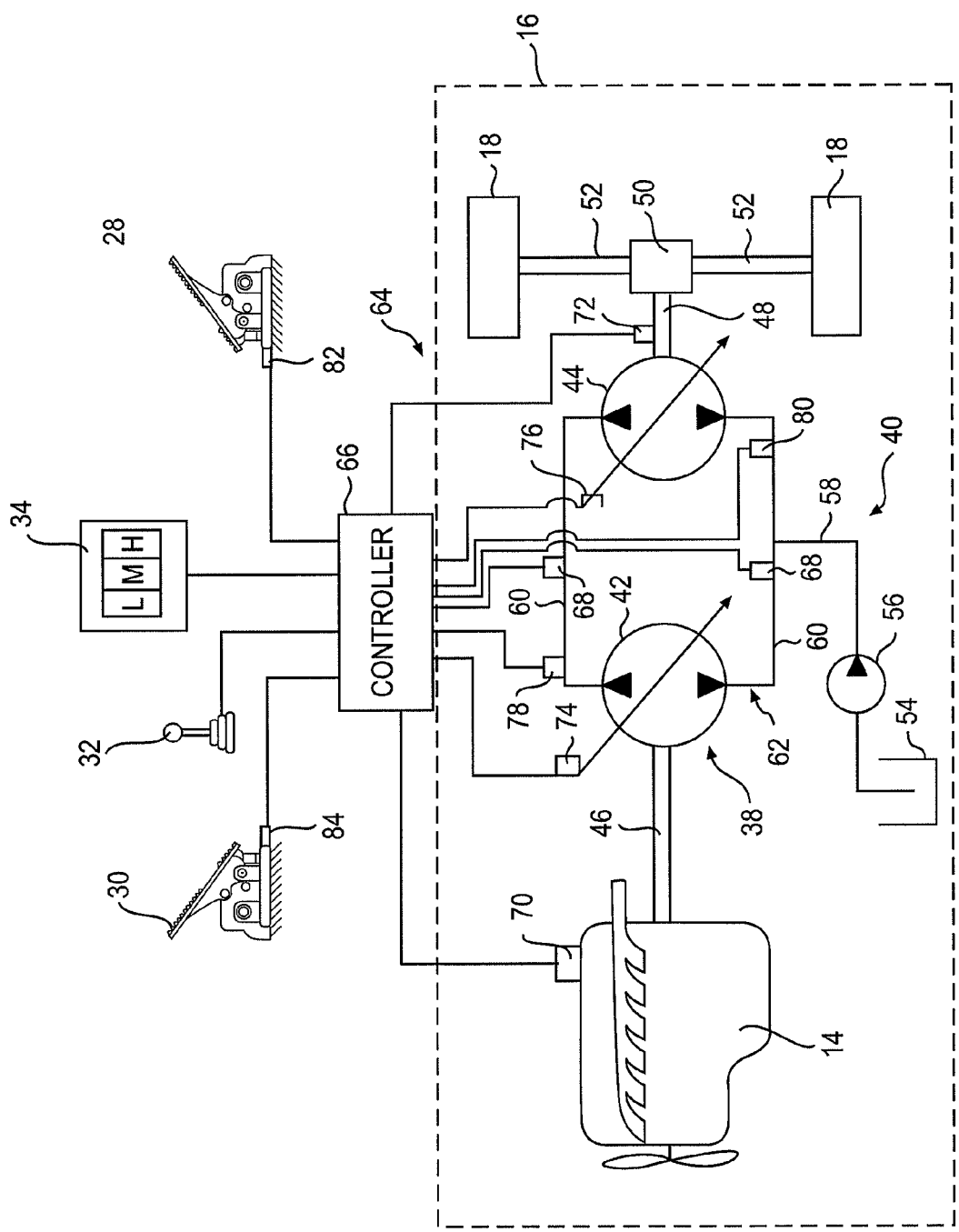
FIG. 3 is a schematic view of exemplary embodiments of a prime mover, power train, and control system.

As shown in FIG. 3, power train 16 may include one or more transmissions 38 configured to operably couple prime mover 14 to traction devices 18. For example, machine 10 may include a hydraulic system 40, which includes a hydraulic transmission 38, such as, for example, any transmission that uses fluid flow to transfer power between a prime mover and traction devices. For example, transmission 38 may be a continuously-variable transmission, such as, for example, a hydraulic transmission that includes a hydraulically-operated pump and a hydraulically-operated motor, sometimes referred to as a "hydrostatic" transmission.

In the exemplary machine 10 shown in FIG. 3, power train 16 includes a single hydrostatic transmission 38 configured to supply power to one or more of traction devices 18. Although the exemplary power train 16 shown in FIG. 3 includes a single hydrostatic transmission 38, a machine may include two or more hydrostatic transmissions. For example, a machine may include a separate hydrostatic transmission 38 for each traction device.

As illustrated in FIG. 3, exemplary hydrostatic transmission 38 is operably coupled to prime mover 14, and includes a fluid pump 42 fluidly coupled to a fluid motor 44 via a fluid circuit. Pump 42 and/or motor 44 may be variable displacement, variable delivery, fixed-displacement, or any other configuration known in the art. Pump 42 is operably coupled to prime mover 14, for example, via an input shaft 46. Alternatively, pump 42 may be operably coupled to prime mover 14 via a torque converter (not shown), a clutch (not shown), a gear box (not shown), or in any other manner known in the art. Hydrostatic transmission 38 may also include an output shaft 48 operably coupling motor 44 to one or more of traction devices 18 via, for example, a differential 50 and one or more axles 52. Although the exemplary transmission shown in FIG. 3 includes a single pump 42 and a single motor 44, transmission 38 may have one or more pumps 42 and one or more motors 44.

Exemplary hydraulic system 40 may include a reservoir 54 configured to supply hydraulic fluid to hydraulic system 40 via a charging pump 56 and a source line 58. Pump 42 may be configured to draw hydraulic fluid from reservoir 54, via source line 58, with the assistance of charging pump 56. Pump 42 may be further configured to supply hydraulic fluid to hydraulic motor 44, along fluid lines 60. Pump 42, motor 44, and fluid lines 60 of hydrostatic transmission 38 may form a closed fluid circuit 62 in which one of hydraulic lines 60 carries fluid from pump 42 to motor 44, and the other of hydraulic lines 60 returns hydraulic fluid from motor 44 to pump 42. Hydraulic fluid flowing through motor 42 causes motor 42 to rotate, which results in supplying torque to output shaft 48. The direction of fluid flow in fluid circuit 62 is reversible, such that output shaft 48 may be driven in two directions, thereby providing machine 10 with the ability to be driven in either a forward or reverse direction.

Exemplary machine 10 includes a control system 64 configured to control operation of prime mover 14 and/or power train 16. In particular, exemplary control system 64 includes a controller 66 and one or more sensors configured to provide signals indicative of parameters related to power train 16. For example, control system 64 may include one or more sensors 68 configured to provide signals indicative of pressure in fluid circuit 62. Control system 64 may also include one or more sensors related to the operation of prime mover 14, such as, for example, and an engine speed sensor 70. In addition, control system 64 may include one or more sensors configured to provide signals indicative of the travel speed of machine 10, such as, for example, a sensor 72 configured to provide signals indicative of the speed of pump 44 and/or output shaft 48.

According to the exemplary embodiment shown in FIG. 3, controller 66 may be configured to control operation of transmission 38 by supplying control signals for operation of pump 42 and motor 44. In particular, controller 66 may control fluid flow in transmission 38 by, for example, controlling the displacement and/or speed of pump 42 and/or motor 44. For example, transmission 38 may include a pump actuator device 74 (e.g., including solenoid and spool valve assemblies) configured to vary the displacement of pump 42. Transmission 38 may further include a motor actuator device 76 (e.g., including solenoid and spool valve assemblies) configured to vary the displacement of motor 44.

According to some embodiments, control system 64 may further include a sensor 78 for supplying signals indicative of the flow rate of fluid through pump 42, such as, for example, a sensor for supplying signals indicative of the displacement and/or speed of pump 42, and/or flow meters. Similarly, control system 64 may include a sensor 80 for supplying signals indicative of the flow rate of fluid through motor 44, such as, for example, a sensor for supplying signals indicative of the displacement and/or speed of motor 44, and/or flow meters. It is contemplated that machine 10 may include additional sensors for sensing other parameters that may be useful for operation of prime mover 14 and/or power train 16.

Controller 66 may control displacement of pump 42 and/or motor 44 based on signals received from one or more of operator interface devices 24, sensors 68, 70, 72, 78, and/or 80. Such signals may be in the form of digital, analog, mechanical, and/or hydraulic signals. For example, operator interface devices 24 may provide signals indicative of an operator's speed and/or steering commands that are received by controller 66. Controller 66 receives signals from one or more of sensors 68, 70, 72, 78, and/or 80, and controller 66 controls fluid flow in transmission 38 based, at least in part, on the signals received from operator interface devices 24 and the one or more sensors. By controlling the fluid flow, controller 66 may operate to control the magnitude of the torque supplied to one or more of traction devices 18.

Exemplary controller 66 may include any components that may be used to run an application, such as, for example, a memory, a secondary storage device, and/or a central processing unit. According to some embodiments, controller 66 may include additional or different components, such as, for example, mechanical and/or hydro-mechanical components. Various other known components may be associated with controller 66, such as, for example, power supply circuitry, signal-conditioning circuitry, solenoid driver circuitry, and/or other appropriate circuitry. Such circuits may be electrical and/or hydro-mechanical.

Transmission 38 may be at least partially controlled by the operator with right- and left-foot pedals 28 and 30. For example, pedals 28 and 30 may be coupled respectively to sensors 82 and 84 that are configured to sense the displacement of pedals 28 and 30 and produce corresponding signals responsive to the displacement. Sensors 82 and 84 may be any sensor capable of sensing the displacement of pedals 28 and 30, such as, for example, switches or potentiometers. The displacement signals from each of sensors 82 and 84 may be received by controller 66, and controller 66 may operate transmission 38 based on the signals.

According to some embodiments, right-foot pedal 28 may operate in a manner similar to an accelerator pedal. In particular, as right-foot pedal 28 is depressed, corresponding sensor 82 sends signals indicative of the magnitude of the displacement of right-foot pedal 28 to controller 66. Controller 66, in turn, increases the throttle setting of prime mover 14, thereby increasing the power supplied to pump 42. According to some embodiments, if machine 10 is stopped, the initial displacement setting of pump 42 is at a minimum (e.g., approaching zero), and the initial displacement of motor 44 is at a maximum. As the operator commands more travel speed by depressing right-foot pedal 28, the displacement of pump 42 increases as controller 66 sends signals to pump actuator device 74 to increase displacement, thereby increasing the fluid flow in fluid circuit 62 through motor 44. As the fluid flow initially increases, the displacement of motor 44 remains fixed, and thus, the speed of rotation of motor 44 increases, thereby increasing the speed of traction devices 18 and the travel speed of machine 10.

If the operator depresses right-foot pedal 28 a sufficient displacement for a sufficient period of time, controller 66 continues to increase the displacement of pump 42 until it reaches a maximum displacement, such that the fluid flow in fluid circuit 62 increases, and the travel speed of machine 10 continues to increase. Once the displacement of pump 42 reaches its maximum, the controller 66 sends signals to motor actuator device 76, so that the displacement of motor 44 begins to decrease. As the displacement of motor 44 decreases, and the fluid flow to motor 44 provided by pump 42 continues at the same flow rate. Thus, as the displacement of motor 44 decreases, the speed of motor 44 increases in order to maintain the fluid flow rate provided by pump 42. As a result, the travel speed of the machine 10 continues to increase as the displacement of motor 44 continues to decrease.

As the operator reduces the displacement of right-foot pedal 28, sensor 82 sends corresponding signals to motor actuator device 76, thereby increasing the displacement of motor 44, resulting in the speed of motor 44 decreasing, thereby decreasing the travel speed of machine 10. Once the displacement of motor 44 returns to its maximum and the travel speed of machine 10 slows, the displacement of pump 42 may be decreased in order to further reduce the travel speed of machine 10.

According to some embodiments, left-foot pedal 30 may operate to provide two functions, depending on the amount of displacement by the operator. In particular, as left-foot pedal 30 is depressed through a first portion of its range, left-foot pedal 30 operates according to a first mode of operation until the displacement of left-foot pedal 30 reaches a predetermined threshold, such as, for example, about 50% of its total displacement range. As left-foot pedal 30 is depressed past the predetermined threshold and enters a second portion of its range, left-foot pedal 30 operates according to a second mode of operation until the displacement of left-foot pedal 30 returns to a position in the first portion of its range.

For example, as the operator depresses left-foot pedal 30 within the first portion of its displacement range, the travel speed of machine 10 is reduced, with a greater reduction in travel speed occurring as left-foot pedal 30 is displaced further from the un-depressed position of its range. According to some embodiments, within this first portion of its displacement range, the travel speed of machine 10 is reduced independently of the pressure in fluid circuit 62. Thus, if machine 10 is traveling at a certain speed, and the operator initially depresses left-foot pedal 30, sensor 84 sends signals to controller 66, and controller 66 sends signals to motor 44, such that the travel speed of machine 10 is reduced. If the operator depresses left-foot pedal 30 past the predetermined threshold into the second portion of its range, the service brakes (not shown) may be activated, thereby reducing the travel speed of machine 10. For example, the service brakes may be activated either via sensor 84 sending signals to controller 66, which, in turn, activates the service brakes, or via hydraulic and/or mechanical linkage.

When machine 10 encounters a load during operation, the pressure in fluid circuit 62 may increase. For example, machine 10 may encounter a load when, for example, machine 10 pushes against a pile of material, lifts material, or travels up a grade. During such operations, the force of the load on machine 10 may be transferred to motor 44 in the form of torque tending to slow the speed of motor 44. For example, as machine 10 travels toward a pile of material, controller 66 controls the flow in fluid circuit 66 according to the method described previously, wherein control of the flow controls the travel speed of machine 10. However, as machine 10 begins to engage the pile of material, travel of machine 10 may be inhibited due to the resistance to motion resulting from the pile of material. As the resistance increases, the force of the increased resistance is transferred to motor 44. Control system 64 operates to prevent the pressure in fluid circuit 62 from reaching undesirable levels by controlling operation of pump 42 and/or motor 44.

According to some embodiments, as the resistance to travel is transferred to motor 44, controller 66 may receive signals from pressure sensor 68 indicating a rise in pressure in fluid circuit 62. According to some embodiments, as the pressure approaches or reaches a pressure limit, controller 66 may limit the pressure in fluid circuit 62 to a level below the pressure limit by controlling operation of pump 42 and/or motor 44. As explained in more detail below, according to some embodiments, the pressure limit may be variable and may be based at least in part on the operator's manipulation of operator interface devices 24.

According to some embodiments, controller 66 may control the pressure in fluid circuit 62 in two ranges. In a first range, the displacement of motor 44 is controlled in order to maintain the pressure below the pressure limit. For example, as the pressure reaches the pressure limit, controller 66 may send signals to motor actuator device 76, so that the displacement of motor 44 is increased. By increasing the displacement of motor 44, the speed of machine 10 is reduced, and pressure in fluid circuit 62 may be reduced. If the pressure in fluid circuit 62 continues to be higher than the pressure limit, and the displacement of motor 44 reaches its maximum, in a second range, controller 66 may send signals to pump actuator device 74, so that the displacement of pump 42 is reduced, thereby reducing the flow rate in fluid circuit 62. As the flow rate is reduced, the pressure in fluid circuit 62 decreases. As the displacement of pump 42 approaches zero, the travel speed of machine 10 approaches zero. In this exemplary manner, the pressure in fluid circuit 62 may be maintained below the pressure limit using a closed-loop, feedback control arrangement. According to some embodiments, rather than using a pressure sensor for feedback control, it is contemplated that control system 64 may use hydro-mechanical equivalents to perform the exemplary functions described herein.

According to some embodiments, the pressure limit may be variable rather than fixed. For example, the pressure limit may be based on one or more of the following: a maximum fixed pressure limit, a rim-pull reduction factor based on signals from rim-pull selector 34, an engine torque pressure limit, and signals from right- and left-foot pedals 28 and 30.

As the pressure limit changes due to one or more of these factors, controller 66 operates pump 42 and motor 44, so that pressure in fluid circuit 62 remains below the variable pressure limit, for example, by controlling the displacement of pump 42 and/or motor 44.

According to some embodiments, the maximum fixed pressure limit is a fixed pressure limit based on design considerations of machine 10. For example, the maximum fixed pressure limit may be established empirically or experimentally, and may be intended to prevent undue wear or premature failure of the components of prime mover 14 and/or power train 16. As explained below, controller 66 may be configured to modify the maximum fixed pressure limit based on operator selections.

For example, according to some embodiments, the maximum fixed pressure limit may be modified by the operator via use of rim-pull selector 34. An operator may elect to use rim-pull selector 34 in order to reduce the maximum amount of torque that traction devices 18 apply to the ground. This may be desirable based on the operating environment of machine 10 and/or the type of operation being performed by machine 10. For example, if machine 10 is operating in relatively low-traction environment, such as on, for example, snow, ice, or loose terrain, it may be desirable to reduce the maximum torque at traction devices 18 in order to reduce excessive slip of traction devices 18, such as wheel spin. This may render machine 10 more easily controllable in such conditions. In addition, some operations of machine 10 may require a relatively more delicate application of force. For example, if machine 10 is being used to push together pipes, it may be desirable to limit the amount of force machine 10 may apply to the pipes, for example, in order to prevent damage to the pipes. In such an exemplary situation, it may be desirable for the operator to limit the maximum amount of torque supplied to traction devices 18.

Rim-pull selector 34 may be configured to permit an operator to select from a menu including a plurality of rim-pull selection settings. For example, in the exemplary embodiment shown in FIGS. 2 and 3, rim-pull selector 34 includes three selection settings corresponding to low (L), medium (M), and high (H) rim-pull torques. As an example, the operator might select low when operating machine 10 in snow, medium when operating machine 10 in dirt, and high when operating machine 10 on asphalt.

Controller 66 may be configured to receive signals from rim-pull selector 34 and modify, or scale back, the maximum fixed pressure limit. For example, the rim-pull selection may correlate to a rim-pull scale factor (e.g., a scale factor ranging from zero to one), and the rim-pull scale factor may be multiplied by the maximum fixed pressure limit to adjust the pressure level in fluid circuit 62, resulting in a modified maximum fixed pressure limit. Although the exemplary rim-pull selector shown in FIG. 3 may be used to select a low, medium, or high rim-pull setting, these settings are exemplary and other settings are contemplated, such as, for example, settings ranging continuously between a lowest setting and a highest setting.

According to some embodiments, based on the rim-pull setting selected by an operator, controller 66 may determine a rim-pull scale factor based on the travel speed of machine 10. For example, for each rim-pull setting, controller 66 may be configured to determine the rim-pull scale factor based on a correlation between the travel speed of machine 10 and the rim-pull scale factor. Such correlations may take the form of, for example, maps, look-up tables, and/or equations. According to some embodiments, the rim-pull scale factor may generally decrease as the travel speed of machine 10 increases, and may generally increase as the travel speed of machine 10 decreases. According to some embodiments, a rim-pull scale factor about 0.3 may correspond to the low rim-pull setting at a moderate travel speed, a rim-pull scale factor of about 0.6 may correspond to the medium rim-pull setting at a moderate travel speed, and a rim-pull scale factor of about 1.0 may correspond to a high rim-pull setting at a moderate travel speed. These scale factors are exemplary only. By selecting the rim-pull setting using rim-pull selector 34, the operator may tailor the operation of power train 16 to be more compatible with the environment in which machine 10 is being operated and/or the type of operation being performed by machine 10.

According to some embodiments, control system 64 may also determine an engine torque pressure limit. The engine torque pressure limit is a pressure limit based on the maximum amount of torque that prime mover 14 is able to supply at a given engine speed. For example, at a particular engine speed, prime mover 14 is able to supply a particular amount of torque to pump 42. Based on the displacement of pump 42, the maximum amount of torque that can be supplied by prime mover 14 corresponds to a pressure across pump 42. At this pressure, the engine torque pressure limit may be based on the engine speed of prime mover 14 and the displacement of pump 42. According to some embodiments, controller 66 is configured to determine the engine torque pressure limit based on the engine speed of prime mover 14 and the displacement of pump 42 by, for example, use of maps, look-up tables, and/or equations that correlate engine speed, pump displacement, and pressure. For example, controller 66 may receive signals from a sensor associated with prime mover 14 and signals indicative of the displacement of pump 42, and determine the engine torque pressure limit.

According to some embodiments, controller 66 may compare the maximum fixed pressure limit, for example, as modified based on the rim-pull scale factor, with the engine torque pressure limit. For example, controller 66 may select the lesser of the modified maximum fixed pressure and the engine torque pressure limit, and base the variable pressure limit on the selected pressure limit to control operation of the prime mover 14 and/or power train 16 according to the variable pressure limit.

According to some embodiments, once controller 66 has selected between the modified maximum fixed pressure limit and the engine torque pressure limit, controller 66 may further modify the variable pressure limit based on the operator's movement of right- and left-foot pedals 28 and 30. For example, controller 66 may determine a pedal scale factor based on signals from right-foot and/or left-foot pedals 28 and 30. According to some embodiments, as right-foot pedal 28 is depressed, a right-foot pedal scale factor ranging from zero to one is selected, such that when right-foot pedal 28 is not depressed, the right-foot pedal scale factor approaches zero, and as right-foot pedal 28 is fully depressed, the right-foot pedal scale factor approaches one. According to some embodiments, as left-foot pedal 30 is depressed, for example, from 0% to 50% of its range, a left-foot pedal scale factor ranging from one to zero is selected, such that when left-foot pedal is not depressed, the left-foot pedal scale factor approaches one, and as left-foot pedal 30 is fully depressed, the left-foot pedal scale factor approaches zero. According to some embodiments, the right-foot pedal scale factor and the left-foot pedal scale factor are multiplied together to determine a combined pedal scale factor. According to some embodiments, rather than multiplying the scale factors (or in addition to multiplying the scale factors), other mathematical operations may be applied to the scale factors, such as, for example, a minimum or maximum may be selected, the scale factors may be added together, an average of the scale factors may be calculated, etc., depending on, for example, the type of control characteristic desired.

According to some embodiments, controller 66 is configured to determine the variable pressure limit for fluid circuit 62 by multiplying the combined pedal scale factor by the lesser of (1) the maximum fixed pressure limit, as modified by, for example, the rim-pull scale factor, and (2) the engine torque pressure limit scale factor. As noted above, the pressure limit determined in this exemplary manner may be continuously variable and may be determined in real-time during operation of machine 10. The variable pressure limit determined in this exemplary manner may result in machine 10 operating in a more responsive manner, which may result in more comfortable control of machine 10 for the operator, while still maintaining pressure in fluid circuit 62 below the maximum fixed pressure limit.

Upon determination of the variable pressure limit, controller 66 may control operation of prime mover 14 and power train 16, such that the pressure in fluid circuit 62 is maintained at a level below the variable pressure limit. According to some embodiments, controller 66 may adjust the displacement of pump 42 and/or motor 44 by sending signals to pump actuator device 74 and/or motor actuator device 76 in order to maintain the pressure in fluid circuit 62 at a level below the variable pressure limit.

INDUSTRIAL APPLICABILITY

The disclosed system and method for controlling a transmission may be used with any machine having a transmission including a fluid pump and a fluid motor. The disclosed system and method may result in improved operation of a machine. For example, the disclosed system and method may facilitate tailoring of the operation of a machine according to operator preferences based on, for example, the environment in which the machine is being operated and/or the type of operation being performed by the machine. For example, it may be desirable to limit the maximum amount of torque supplied to traction devices 18 in order to prevent undesirable slipping.

Figure 4:
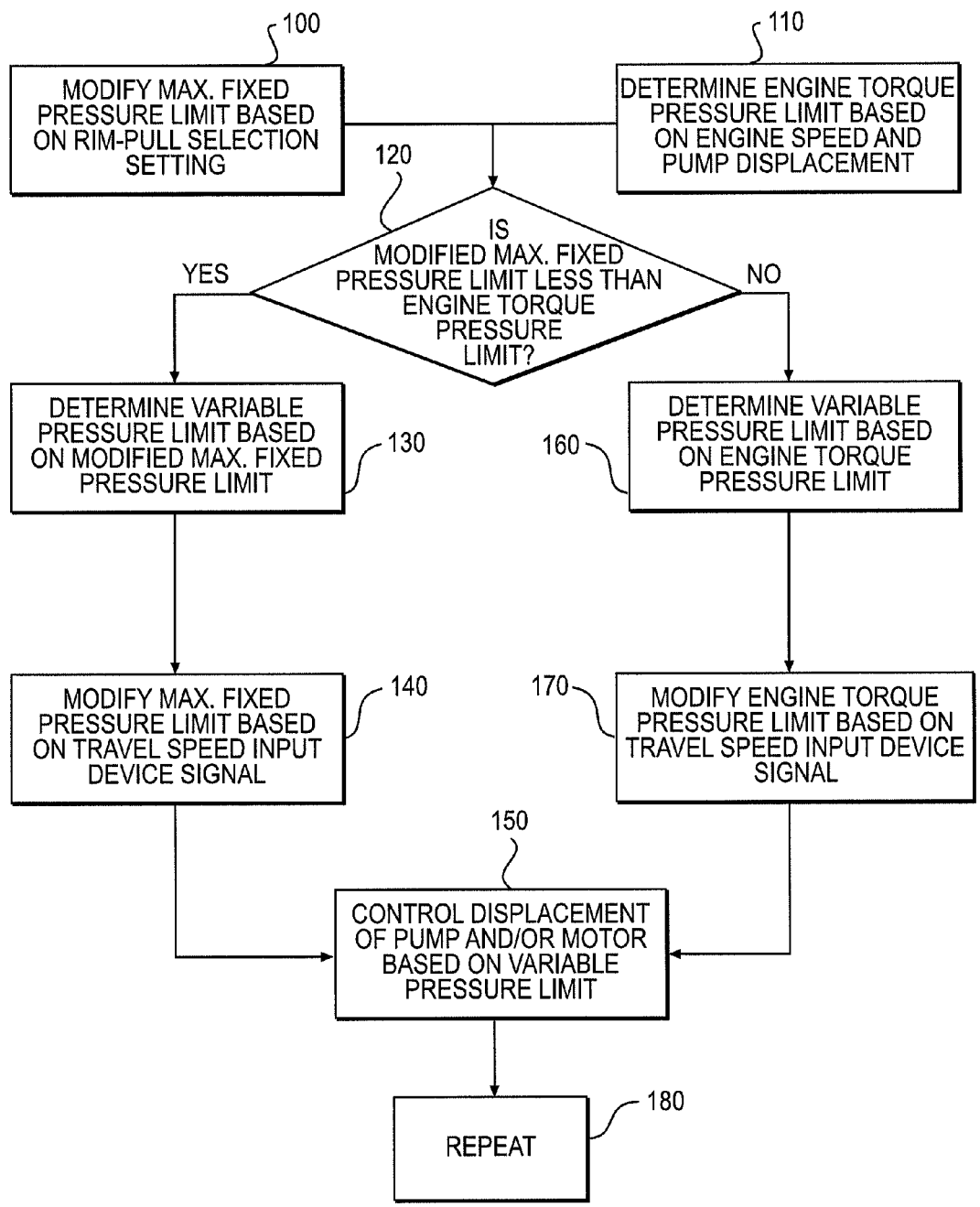
FIG. 4 is a flow diagram illustrating an exemplary embodiment of a method for controlling a transmission.

FIG. 4 shows a flow chart of an exemplary embodiment of a method of controlling a transmission including a fluid pump and a fluid motor operably coupled to one another in a fluid circuit. According to the exemplary embodiment shown in FIG. 4, the method begins by modifying the maximum fixed pressure limit at step 100 based on a rim-pull selection setting. According to some embodiments, the rim-pull setting selection may be made via rim-pull selector 34. At step 110, the engine torque pressure limit may be determined, based on, for example, the current engine speed and the current displacement of fluid pump 42. At step 120, the modified maximum fixed pressure limit is compared to the engine torque pressure limit. If the modified maximum fixed pressure limit is less than the engine torque pressure limit, at step 130, the variable pressure limit is determined based on the modified maximum fixed pressure limit. At step 140, the modified maximum fixed pressure limit may be further modified based on signals from one or more of the travel speed input devices, as described above. Thereafter, at step 150, the displacement of fluid pump 42 and/or fluid motor 44 is controlled based on the variable pressure limit, for example, such that a pressure level in the fluid circuit is substantially maintained below the variable pressure limit.

However, if at step 120, the modified maximum fixed pressure limit is not less than the engine torque pressure limit, at step 160, the variable pressure limit may be determined based on the engine torque pressure limit. At step 170, the engine torque pressure limit may be modified based on signals from one or more of the travel speed input devices, as described above. Thereafter, at step 150, the displacement of fluid pump 42 and/or fluid motor 44 is controlled based on the variable pressure limit, for example, such that a pressure level in the fluid circuit is substantially maintained below the variable pressure limit. At step 180, steps 100-170 may be repeated as machine 10 continues to be operated. In this exemplary manner, the variable pressure limit may be updated on a continuous basis during operation of machine 10, and the displacement of fluid pump 42 and/or fluid motor 44 may be controlled based on the variable pressure limit.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for controlling a transmission comprising a fluid pump and a fluid motor operably coupled to one another in a fluid circuit, the system comprising:
  a controller configured to
    receive signals indicative of operator inputs from an operator interface device,
    determine a scale factor based on the signals indicative of operator inputs, and multiply the scale factor by a maximum fixed pressure limit to determine a modified maximum fixed pressure limit,
    determine an engine torque pressure limit based on a displacement associated with an engine torque limit,
    determine a variable pressure limit in the fluid circuit based on a lesser of the engine torque pressure limit and the modified maximum fixed pressure limit, and
    control displacement of at least one of the fluid pump and the fluid motor based on the variable pressure limit, such that a pressure level in the fluid circuit is maintained below the variable pressure limit.

2. The system of claim 1, further including an operator interface device configured to facilitate selection of a maximum torque level supplied by the fluid motor.

3. The system of claim 1, further including a travel speed input device, and wherein the controller is configured to determine the variable pressure limit based on signals from the travel speed input device and the lesser of the engine torque pressure limit and the modified maximum fixed pressure limit.

4. The system of claim 3, wherein the controller is configured to determine a scale factor associated with the signals from the travel speed input device, and multiply the scale factor associated with the travel speed input device with the lesser of the engine torque pressure limit and the modified maximum fixed pressure limit to determine the variable pressure limit.

5. The system of claim 3, wherein the travel speed input device includes a foot pedal.

6. The system of claim 1, further including a pressure sensor configured to send signals indicative of pressure in the fluid circuit, wherein the controller is configured to control displacement of at least one of the fluid pump and the fluid motor based on the variable pressure limit and the signals indicative of pressure in the fluid circuit, such that the pressure level in the fluid circuit is substantially maintained below the variable pressure limit.

7. A method for controlling a transmission comprising a fluid pump and a fluid motor operably coupled to one another in a fluid circuit, the method including:
  receiving signals indicative of operator inputs from an operator interface device,
  determining a scale factor based on the signals indicative of operator inputs, and multiplying the scale factor by a maximum fixed pressure limit to determine a modified maximum fixed pressure limit,
  determining an engine torque pressure limit based on a displacement associated with an engine torque limit, and
  determining a variable pressure limit in the fluid circuit based on a lesser of the engine torque pressure limit and the modified maximum fixed pressure limit,
  controlling displacement of at least one of the fluid pump and the fluid motor based on the variable pressure limit, such that a pressure level in the fluid circuit is maintained below the variable pressure limit.

8. The method of claim 7, further including receiving signals from a travel speed input device and determining the variable pressure limit based on the signals from the travel speed input device.

9. The method of claim 8, wherein determining the variable pressure limit based on the signals from the travel speed input device includes determining a scale factor associated with the signals from the travel speed input device, and determining the variable pressure limit by multiplying the scale factor associated with the signals from the travel speed input device with the lesser of the engine torque pressure limit and the modified maximum fixed pressure limit.

10. The method of claim 7, further including receiving signals indicative of pressure in the fluid circuit, and controlling displacement of at least one of the fluid pump and the fluid motor based on the variable pressure limit and the signals indicative of pressure in the fluid circuit, such that the pressure level in the fluid circuit is substantially maintained below the variable pressure limit.

11. A machine comprising:
  a chassis;
  a prime mover coupled to the chassis;
  a transmission coupled to the prime mover, the transmission including:
    a fluid pump configured to provide a flow of fluid,
    a fluid motor configured to receive the flow of fluid from the fluid pump, and
    fluid lines providing a fluid circuit including the fluid pump and the fluid motor;
  traction devices coupled to the transmission, such that the traction devices are supplied with torque from the transmission; and
  a controller configured to
    receive signals indicative of operator inputs from an operator interface device,
    determine a scale factor based on the signals indicative of operator inputs, and multiply the scale factor by a maximum fixed pressure limit to determine a modified maximum fixed pressure limit,
    determine an engine torque pressure limit based on a displacement associated with an engine torque limit,
    determine the variable pressure limit based on a lesser of the engine torque pressure limit and the modified maximum fixed pressure limit, and
    control displacement of at least one of the fluid pump and the fluid motor based on the variable pressure limit, such that a pressure level in the fluid circuit is maintained below the variable pressure limit.

12. The machine of claim 11, further including a selector configured to facilitate selection of a maximum amount of torque supplied to the traction devices by the transmission.

13. The machine of claim 11, further including a travel speed input device configured to facilitate control of travel speed of the machine.

14. The machine of claim 11, further including a pressure sensor associated with the fluid circuit, the pressure sensor being configured to provide signals indicative of pressure in the fluid circuit, wherein the controller is configured to control the displacement of at least one of the fluid pump and the fluid motor based on the variable pressure limit and signals from the pressure sensor.

15. The machine of claim 14, wherein the controller is configured to control displacement of the fluid pump based on the variable pressure limit and the signals from the pressure sensor.

* * * * *